United States Patent [19]

Miyashita

[11] Patent Number: 5,014,139

[45] Date of Patent: May 7, 1991

[54] REFERENCE TRACK DETECTION FOR A DISC STORAGE UNIT

[75] Inventor: Takashi Miyashita, Kawasaki, Japan

[73] Assignee: Fuji Electric Co., Ltd., Kawasaki, Japan

[21] Appl. No.: 287,094

[22] Filed: Dec. 21, 1988

[30] Foreign Application Priority Data

Dec. 29, 1987 [JP] Japan .................................. 62-335390

[51] Int. Cl.$^5$ ........................ G11B 5/55; G11B 21/08
[52] U.S. Cl. .............................. 360/78.14; 360/78.13
[58] Field of Search ............... 360/75, 77.01–77.11, 360/78.01, 78.04–78.14; 318/685, 696

[56] References Cited

U.S. PATENT DOCUMENTS

| | | | |
|---|---|---|---|
| 4,683,504 | 7/1987 | Cantello et al. | 360/78.14 |
| 4,685,007 | 8/1987 | Nazarian et al. | 360/78.14 |
| 4,745,497 | 5/1988 | Ozawa | 360/77.07 |
| 4,875,114 | 10/1989 | Moteki | 360/77.08 |
| 4,876,618 | 10/1989 | Ide et al. | 360/78.13 |
| 4,884,152 | 11/1989 | Ide | 360/78.14 |

Primary Examiner—Vincent P. Canney
Assistant Examiner—Steven R. Garland
Attorney, Agent, or Firm—Spencer & Frank

[57] ABSTRACT

Servo information is written in advance by distinctly defining the boundary between a servo information area into which the servo information is written and a blank area into which the servo information is not written in a manner that the boundary has a predetermined relationship with a reference track as a reference for a head position to be detected. The reference track is detected by displacing the head to read out the servo information so that the boundary is detected while the head is being displaced. The reference track is detected by computing a radial position of the detected boundary.

8 Claims, 5 Drawing Sheets

REFERENCE TRACK DETECTION FOR A DISC STORAGE UNIT

BACKGROUND OF THE INVENTION

1. Field of the Invention

The present invention relates to a reference track detection for a disc storage unit in which a reference track such as the No. 0 track, i.e., the radially outermost track specified from a plurality of tracks defined on a surface of a disc in a disc storage unit such as a fixed disc storage unit is detected, and more particularly to a reference track detecting method and a disc storage unit employing the method in which servo information for detecting a position of a head is written on one surface of a disc and which has a polyphase head driving motor mechanically and closely coupled to the head to displace the head, vector designating means for designating a vector to be defined by phase currents flowing through the head driving motor thereto and servo information reading means for reading out contents of the servo information through the head.

2. Description of the Prior Art

In the disc storage unit, writing or reading of information is performed by positioning on a desired track. This desired track is designated by a track number generally called a cylinder number. When the head is positioned on a desired track in the disc storage unit, the difference between the cylinder number of the desired track and the cylinder number of the track on which the head is positioned at present is computed. Thereafter, the head is displaced radially inwardly or outwardly by the number of tracks corresponding to the difference in cylinder numbers thus computed. To this end, the disc storage unit always stores the cylinder number of the track on which the head is now positioned, and upon completion of the displacement of the head, the stored cylinder number is replaced by a new cylinder number so that the head is ready to be displaced again. When the reference value of the cylinder number is erroneous or is erased, correct reading or writing cannot be carried out. Accordingly, in the disc storage unit, it is required that the stored cylinder number be calibrated periodically to the cylinder number of the track on which the head is positioned, for instance, whenever the disc storage unit is energized.

In order to carry out the calibration described above, a specific track such as the above-described No. 0 track of a plurality of tracks defined on the surface of the disc is designated as a reference track. In the case of the calibration, after the head is properly positioned on the reference track, the stored cylinder number is replaced by the cylinder number assigned to the reference track. However, in order to properly position the head on the reference track in the case of the calibration, it is necessary to provide suitable means for confirming or detecting that the head is properly positioned on the reference track. To this end, a photointerruptor has long been used. As is well known to those skilled in the art, the photointerruptor utilizes the phenomenon that when an object crosses a very fine beam, the light is interrupted. When the photointerruptor transmits a signal representative of the interruption of the light while the head is being displaced, for instance, in the radially outward direction, the displacement of the head is immediately interrupted and the position at which the head is stopped is defined as a reference track position.

In general, the photointerruptor is incorporated into the disc storage unit in such a way that a light beam is interrupted by the head. In practice, the head is mounted on a carriage, and hence in general the photointerruptor is positioned in such a way that the light beam is interrupted by the carriage itself or by a small part attached thereto. It is, of course, apparent that in addition to the photointerruptors of the type described above, any position sensor with a high degree of detection accuracy may be used to detect the reference track.

When the photointerruptor is used, it is possible to detect a position with a high degree of accuracy by reducing the cross section of the light beam to a minimum, but the photointerruptors are not necessarily inexpensive. Especially, in the recently developed disc storage units, there is the tendency of decreasing the track pitch to make it as small as possible in order to increase the data storage density. Under the circumstances, it is required to increase the degree of detection accuracy accordingly. As a result, it becomes difficult to reduce the cost of the photointerruptor. Apart from the high cost of the photointerruptor, fine adjustment of the position of the photointerruptor with an extremely high degree of accuracy of the order of 10 $\mu$m is required when the photointerruptor is incorporated into the disc storage unit. This fine ajustment causes additional cost and a longer work time. Even if any type of position sensor is used instead of the photointerruptor, the above-described problems essentially remain unsolved.

SUMMARY OF THE INVENTION

In view of the above, it is an object of the present invention to provide a reference track detecting method for a disc storage unit employing a method which substantially solves the above-described problems and detects the reference track with a high degree of accuracy without using any position sensor exclusively for the detection of the reference track.

The present invention utilizes servo information written on the surface of a disc for detecting a position of a head in order to detect the reference track.

In one aspect of the present invention, there is provided a method for detecting a reference track as a reference point when a head is displaced in a disc storage unit in which a plurality of tracks are defined on a surface of a disc and servo information for detecting a position of the head is written onto the surface and which has a polyphase head driving motor mechanically closely coupled to the head for displacing the head, vector designating means for designating a vector defined by polyphase currents flowing through the head driving motor thereto and servo information readout means for reading out the contents of the servo information by the head, the method comprising the steps of:

writing the servo information into a servo information area defined at least in one portion other than a blank area into which the servo information is not written outside of an area in which the tracks are defined within a radial area of the surface in which the head is displaceable in such a way that the boundary between the servo information area and the blank area has a predetermined relationship with the reference track;

sequentially designating vectors to the head driving motor by the vector designating means to sequentially displace the head in a predetermined radial direction;

reading out the servo information by the servo information read-out means while the head is being displaced sequentially in the predetermined radial direction;

detecting the boundary between the servo information area and the blank area in response to whether or not servo information is read out; and computing a position of the reference track in the radial direction based upon the boundary detected to detect the reference track.

In this method, the blank area may be defined only in one area within the radial area in which the head is displaceable in the radial direction.

The tracks may be defined at positions in the radial direction corresponding to either even-numbered or the odd-numbered vectors formed by the polyphase currents flowing through the head driving motor. The servo information may be written at the positions in the radial direction corresponding to the other of the odd-numbered or even-numbered vectors. In the case of the detection of the boundary between the servo information area and the blank area, the head may be sequentially displaced at positions in the radial direction corresponding to the other of the odd-numbered and even-numbered vectors.

The reference track detecting method may further comprise the steps of:

allotting in advance a specific vector, formed by the head driving motor for forming the polyphase currents, to the boundary between the servo information area and the blank area to be detected;

comfirming that the head is brought into a position corresponding to the specific vector while the head is being sequentially displaced;

reading out the servo information by the servo information read-out means when it is confirmed that the head is at the position corresponding to the specific vector; and detecting the boundary by judging whether or not servo information is read out.

In another aspect of the present invention, there is provided a disc storage unit comprising:

a head;

a disc having a plurality of tracks defined on a surface of the disc and servo information for detecting a position of the head, is written onto the surface, the servo information being written into a servo information area defined at least in one portion other than a blank area into which the servo information is not written, outside of an area in which the tracks are defined within a radial area of the surface in which the head is displaceable in such a way that the boundary between the servo information area and the blank area has a predetermined relationship with a reference track as a reference point when the head is displaced;

a polyphase head driving motor mechanically closely coupled to the head for displacing the head;

vector designating means for designating vectors defined by polyphase currents flowing through the head driving motor thereto, the vector designating means sequentially designating vectors to the head driving motor to sequentially displace the head in a predetermined radial direction;

servo information read-out means for reading out the servo information by the head while the head is being displaced sequentially in the predetermined radial direction;

means for detecting the boundary between the servo information area and the blank area in response to whether or not servo information is read out; and means for computing a position of the reference track in the radial direction based upon the boundary detected to detect the reference track.

Here, the blank area may be defined only in one area within the radial area in which the head is displaceable in the radial direction.

The tracks may be defined at positions in the radial direction corresponding to either the even-numbered or the odd-numbered vectors formed by the polyphase currents flowing through the head driving motor. The servo information may be written at the positions in the radial direction corresponding to the other of the odd-numbered or even-numbered vectors. The disc storage unit may further comprise means for sequentially displacing the head to positions in the radial direction corresponding to the other of the odd-numbered or even-numbered vectors in the case of the detection of the boundary between the servo information area and the blank area.

The disc storage unit may further comprise:

means for comfirming that the head is brought into a position corresponding to a specific vector formed by the head driving motor for forming the polyphase currents in such a way that the specific vector is alloted in advance to the boundary between the servo information area and the blank area to be detected, while the head is being sequentially displaced;

the servo information read-out means reading out the servo information when it is confirmed that the head is at the position corresponding to the specific vector; and the means for detecting the boundary detecting boundary by judging whether or not the servo information is read out.

According to the present invention, in the range in which the head can be displaced radially on the surface of the disc, a servo information area in which servo information is to be written and a blank area in which no servo information is to be written are previously defined. However, from the standpoint of the fundamental function of servo information, servo information must be written in an area in which a plurality of tracks are defined. Accordingly, the blank area is defined at at least one portion and more preferably at one position outside of the area in which the tracks are defined. For instance, when, as in the case of a conventional method, the radially outermost track, i.e., No. 0 track is specified as a reference track, the blank area is defined radially outwardly of the radially outermost track No. 0, while the area radially inwardly of the radially outermost track No. 0 is used as the servo information area. Furthermore, servo information is also written in the area radially inwardly of the radially innermost track in which no servo information is written.

According to the present invention, servo information is written by distinctly defining the boundary between the servo information area and the blank area. In the case of the detection of the reference track, the vector designating means sequentially instructs vectors to a head driving motor so that the servo information reading means reads out servo information, while the head is sequentially displaced in a predetermined radial direction, for instance, in the radially outward direction. In the case of the detection of the position of the head in response to the servo information thus read out, the contents or numerical values of the servo information thus read out are important. On the other hand, in the case of the detection of the reference track, it is sufficient only to detect whether or not the servo information is read out. When a position of the head at which the content of the servo information changes between appearance and disappearance, it is judged that the head positions at the boundary between the servo information area and the blank area.

After the boundary between the servo information area and the blank area is detected in the manner described above, the detection of the reference track can be carried out in a simple manner. For instance, when the blank area is defined radially outwardly of the radially outermost track No. 0 which is the reference track as described above, the track immediately radially inwardly of the boundary may be defined as a reference track. However, the reference track is not necessarily specified as the track No. 0 and it is not necessary to define all the area radially outwardly of the track No. 0 as the blank area. In general, when servo information is previously written in such a way that the boundary between the servo information area and the blank area is distinctly correlated with the reference track, the position in the radial direction of the reference track is computed after the boundary is detected in the manner described above, so that the reference track can be detected.

As is now clear from the above-described explanation, according to the present invention, the reference track can be detected by utilizing the servo information which is essential for the disc storage unit, the means for reading out the servo information and the vector designating means for displacing the head by the head driving motor, so that unlike the prior art described above, a position sensor such as a photointerruptor exclusively used for the detection of the reference track can be completely eliminated. As a result, the above-mentioned problems are substantially solved.

As described above, according to the present invention, the head is sequentially displaced to read servo information in the case of the detection of the reference track. Therefore, in the case of a so-called data surface servo information type disc storage unit in which servo information is written only in one portion in the circumference direction of a disc, the servo information is read out after the disc has rotated, so that some time is required until the servo information is read out every time that it is required to detect the reference track. Therefore, if a specific vector is allotted to the position of the head at the boundary between the servo information area and the blank area in advance, the correlation between the head position at the boundary and the specific vector remains unchanged because of the mechanically close coupling between the head driving motor and the head. Thus, it is sufficient that servo information read out at the position of the head corresponding to the specific vector is attempted and that it is detected whether or not servo information is read out. In this manner, the number of times of reading out the servo information can be decreased so time required for the detection of the reference track can be shortened.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
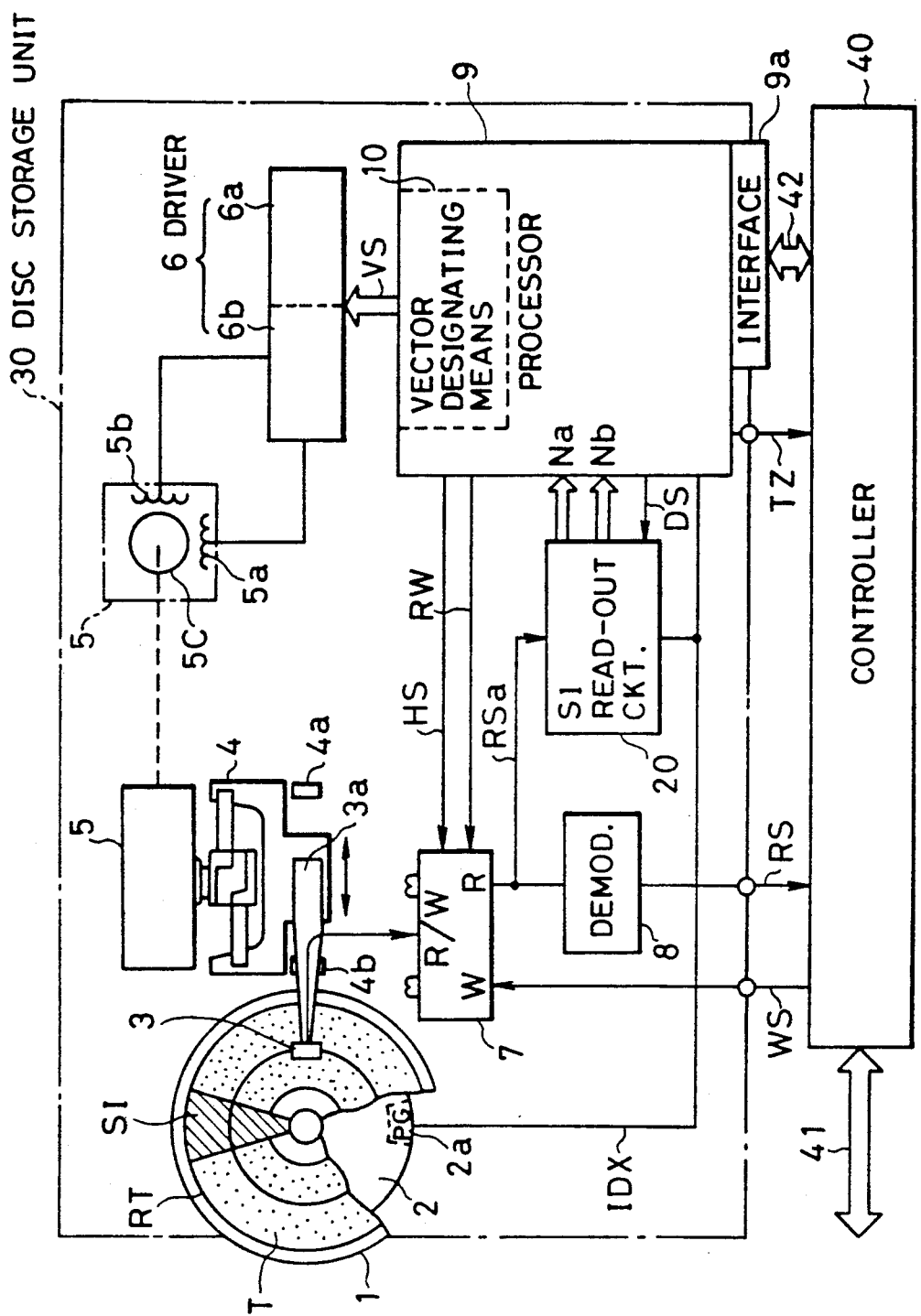
FIG. 1 is a block diagram showing an embodiment of a disc storage unit in accordance with the present invention in which a reference track detecting method in accordance with the present invention is carried out.

FIG. 1 shows an arrangement of a first embodiment of a disc storage unit in accordance with the present invention in which a reference track detecting method in accordance with the present invention is carried out.

In FIG. 1, a disc storage unit 30 indicated by a dash-and-dotted line is combined with a controller 40 and is connected through a bus 41 to a computer (not shown). In this embodiment, the disc storage unit 30 is a fixed disc storage unit and a disc 1 incorporated therein is rotated at a predetermined rotational speed by a spindle motor 2. An area of the disc 1 which is indicated by a number of small dots is an area in which a plurality of tracks T are defined.

In this embodiment, it is assumed that among the tracks T, the radially outermost track No. 0 is designated as a reference track RT as in the case of a conventional method. In this embodiment, servo information SI is written in such a way that the servo information SI interrupts the area of the disc 1 in the circumference direction of the disc 1. In FIG. 1, a hatched area shows an area in which the servo information SI is written. In this embodiment, no servo information SI is written in the area radially outwardly of the reference track RT, but the servo information SI is written even in the area radially inwardly of the radially innermost track, as shown in FIG. 1. That is, according to this embodiment, a blank area in which no servo information SI is written is defined only in one portion in the radial direction of the surface of the disc 1 and a written area is defined only in one portion in the circumferential direction of the surface of the disc 1.

Further, in order to detect the reference track RT, it is advantageous to define a plurality of written areas in the circumferential direction of the surface of the disc 1. For instance, it is preferable in practice that servo information is written in two portions on each surface of the disc 1 and when four surfaces of discs, for instance, are available in the disc storage unit 30, the servo information SI is written in the zig-zag or staggered form, so that eight servo information areas in total are provided in the circumferential direction of all the surfaces of the discs. It is, however, assumed that one servo information area is provided in this embodiment for the sake of simplicity.

A read/write head 3 for writing and reading out information on the tracks T and the servo information SI has a supporting arm 3a, the base of which is carried by a carriage 4 which is movable rightward or leftward as indicated by the arrow in FIG. 1. A head driving motor 5 is mechanically closely coupled to the carriage 4. Therefore, the head 3 is moved in the radial direction on the surface of the disc 1 by the head driving motor 5. As shown in FIG. 1, there are provided a pair of stoppers 4a and 4b which limit the movable range in the rightward and leftward directions as indicated by the arrow, so that the stoppers 4a and 4b define the movable range of the head 3. In this embodiment, the head driving motor 5 is a two-phase stepping motor having two phase coils 5a and 5b and one rotor 5c as indicated in a dash-and-dotted line block.

Figure 2:
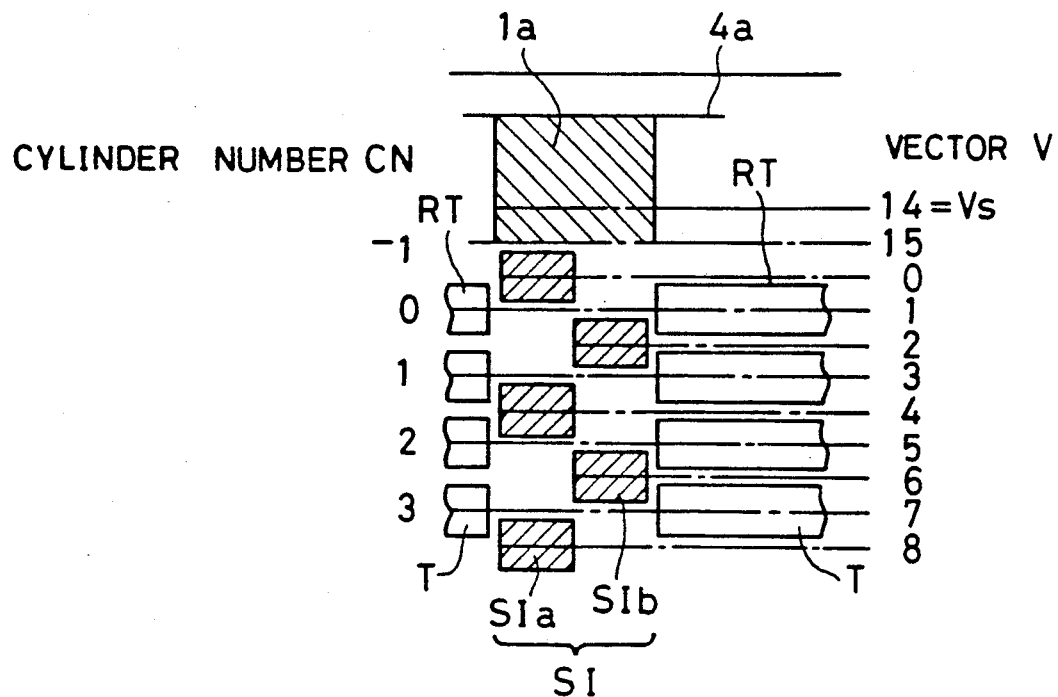
FIG. 2 is an enlarged diagram showing partially a surface of a disc illustrating an example of servo information written.
Figure 3:
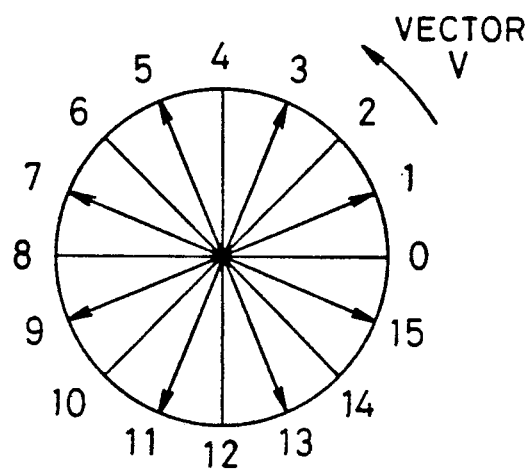
FIG. 3 is a vector diagram illustrating vectors defined by phase currents flowing through a head driving motor.

A vector V formed by the phase currents flowing through the two phase coils 5a and 5b is illustrated in FIG. 3. In this embodiment, 16 vector positions numbered from 0 to 15 as shown in FIG. 3 are defined over the electrical angle of 360°, and as shown in FIG. 2, the odd-numbered vectors V=1, 3, 5, ... correspond to the positions of the tracks T, while the even-numbered vectors V=0, 2, 4, ... correspond to the positions at which the servo information SI is written. These numbers of vector V are represented on the right hand side in FIG. 2 and the cylinder numbers CN of the tracks T corresponding to the vector numbers are represented on the left hand side in FIG. 2. In this embodiment, the servo information SI is divided into two halves SIa and SIb which are written in the zig-zag form. Each of the halves SIa and SIb has, for instance, about 100 simple and repetitive patterns and the numbers of this repetition are read out as the contents Na and Nb of the servo information SI. As is clear from FIG. 2, when the head 3 is positioned on a track, both the numerical values Na and Nb are read out as the contents of the servo information SI. When the head 3 is positioned only above the first half SIa or the second half SIb of the servo information SI, only one of the numbers Na and Nb is read out.

As described above, in this embodiment, the track with the cylinder number CN=0 is designated as the reference track RT and only one of the first halves SIa of the servo information SI is written into an area which is located radially outwardly of the reference track RT. Here, it is assumed that, as shown in FIG. 2, this writing area corresponds to the vector number 0 of the head driving motor 5. No servo information SI is written into an area which is located radially outwardly of the first half SIa of the servo information SI and which is limited by the position corresponding to the stopper 4a. That is, a hatched area shown in FIG. 2 is a blank area 1a into which no servo information SI is written.

Reference numeral 6 designates a driver circuit for driving the driving motor 5. In response to the designated vector signal VS, the driver circuit 6 supplies two phase currents to the phase coils 5a and 5b of the head driving motor 5 to form a vector shown in FIG. 3. The driver 6 has two portions 6a and 6b and the first circuit portion 6a controls the magnitude of the phase current, and the second circuit portion 6b is a switching circuit for switching the positive and negative polarities of the phase current.

All the heads 3 incorporated in the disc storage unit 30 are connected to a read/write circuit 7. In response to the head selection instruction HS supplied from a processor 9 to the read/write circuit 7, one of the heads 3 is selected, and in response to the read/write instruction RW the selected head 3 is switched into the reading or writing mode. An analog signal RSa read out from the read-out terminal R of the read/write circuit 7 is converted into a read-out signal RS of a predetermined modulation system by a demodulator 8 and then is transferred to the controller 40. On the other hand, the write signal WS of the same modulation system from the controller 40 is directly transferred to the write input terminal W of the read/write circuit 7.

Furthermore, the processor 9 for executing overall control is incorporated into the disc storage unit 30. The processor 9 generates and supplies the head selection instruction HS and the read/write instruction RW to the read/write circuit 7. The processor 9 includes a vector designating means 10 in the form of software for supplying the designated vector signal VS to the driver 6. Like a conventional vector designating means, the vector designating means 10 generates sequentially the designated vector signals VS, so that the head 3 is displaced to a desired position by the driver 6 and the head driving motor 5. In addition, the vector designating means 10 adjusts a stationary position of the head 3 by correcting the head position.

Furthermore, the disc storage unit 30 includes a servo information read-out circuit 20 for receiving the above-mentioned read-out signal RSa from the read/write circuit 7. This servo information read-out circuit 20 may be a conventional circuit incorporated in a usual disc storage unit (for instance, the circuit disclosed in FIG. 5 of U.S. Pat. No. 4,745,497 in which reference information RS corresponds to the read-out signal RSa corresponding to the servo information SI in the present invention) and reads out the servo information halves SIa and SIb in synchronism with index pulses IDX generated in synchronism with the rotation of the disc by a pulse generator 2a incorporated into the spindle motor 2 to output data representative of the above-mentioned numbers Na and Nb which represent the contents of the first and second halves SIa and SIb of the servo information SI to the processor 9. The processor 9 also receives the index pulses IDX and is connected to the controller 40 through an interface 9a and a bus 42.

So far the description of one embodiment of the hardware of the disc storage unit in accordance with the present invention has been completed. Now, one example of the control procedure thereof will be described. First, the servo-information writing control procedure will be explained with reference to FIG. 4 illustrating its operation and with reference to FIG. 5 showing a flowchart of one example of the control procedures.

Figure 4:
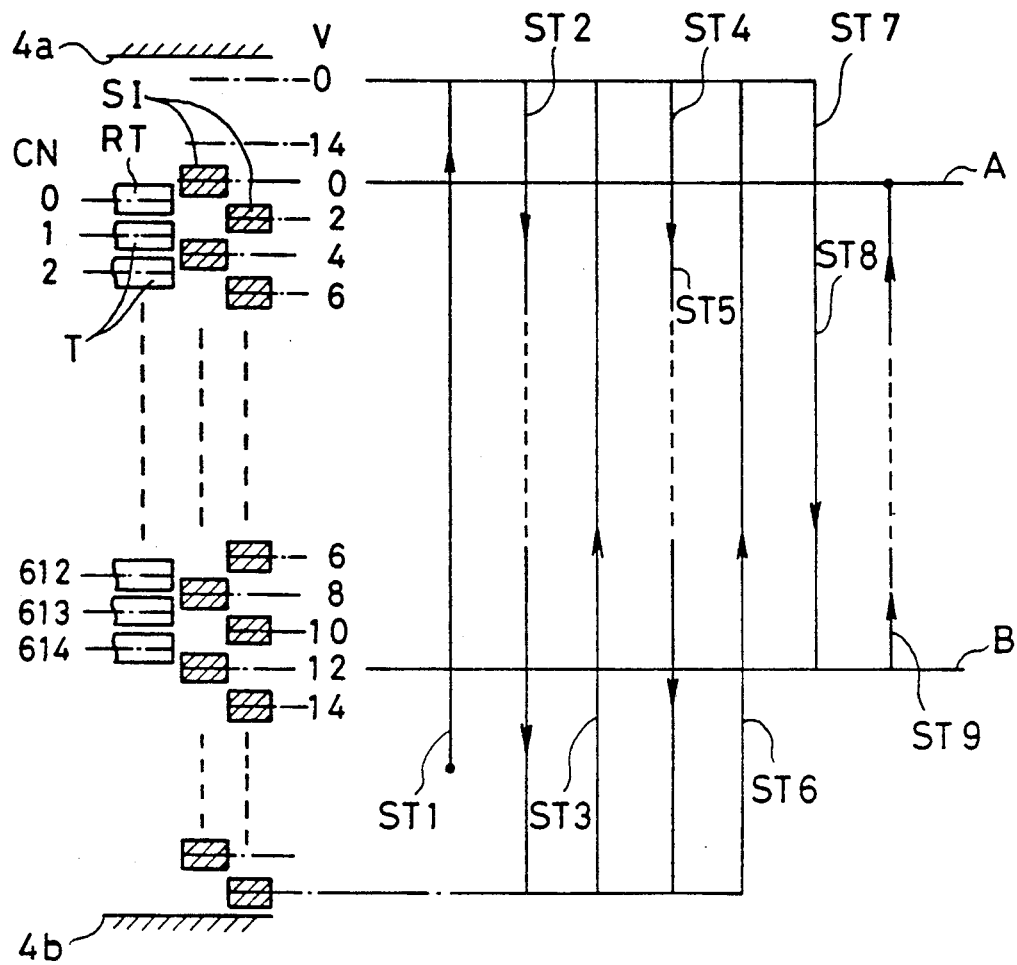
FIG. 4 is an explanatory diagram showing a relationship between an arrangement of written servo information and displacements of a head and used to explain one mode of writing servo information in the embodiment of the present invention.
Figure 5:
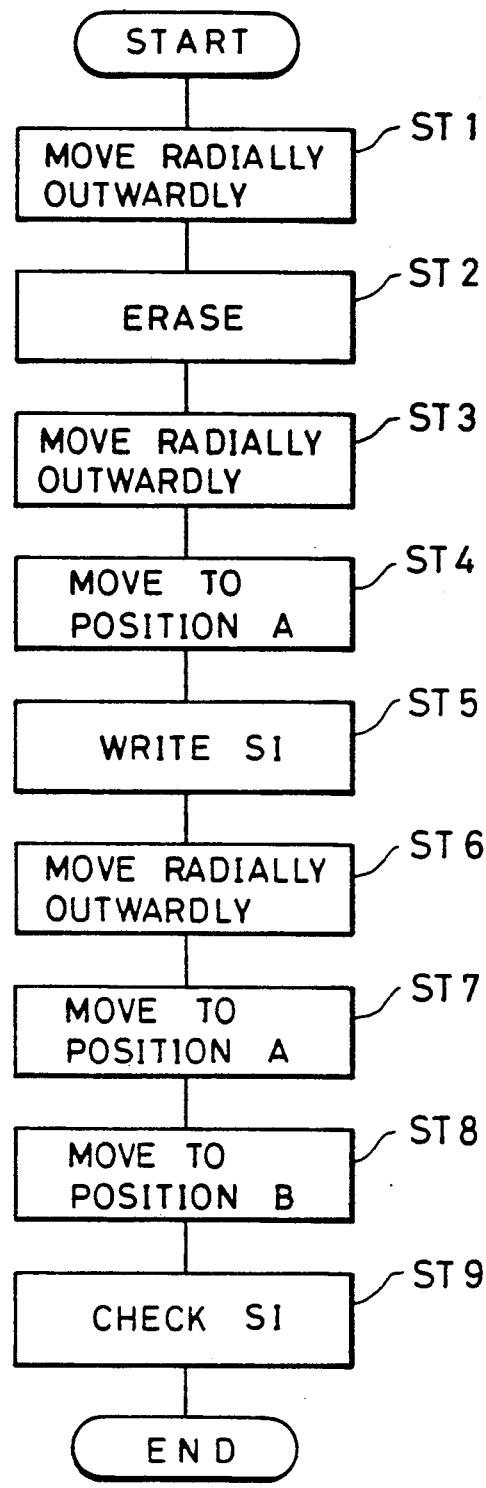
FIG. 5 is a flowchart illustrating one example of servo information writing procedure in the present invention.

The left hand portion in FIG. 4 illustrates positions at which the servo information is written and the positions of tracks together with the positions of the stoppers 4a and 4b in this embodiment. Between the stoppers 4a and 4b, there is defined a range in which the head 3 can be displaced. It is assumed that there are 615 tracks in total between the reference track RT which is the radially outermost track with the cylinder number CN=0 and the track with the cylinder number CN=614. Correspondingly, the servo information SI is written between the area adjacent to the reference track RT and the radially inward stopper 4b, as shown in FIG. 4. The right hand portion in FIG. 4 illustrates schematically the motion of the head 3 when the servo information SI is written and the respective steps are numbered with ST1-ST9 corresponding to the flowchart shown in FIG. 5. There is provided an area corresponding to about eight tracks between the radially outermost track or the reference track RT and the stopper 4a and there is a margin corresponding to about 16 tracks between the radially innermost track and the stopper 4b. Furthermore, only the even number vectors V, for instance, as shown in FIG. 4 are associated with the servo information SI, so that it is further assumed that in the case of the displacement of the head 3, the head 3 is moved by switching two vectors in one step. The succeeding displacement of the head 3 is all carried out by the vector designating means 10.

In step ST1, first the head 3 is radially outwardly displaced to the position of the stopper 4a. In this embodiment, the surface of the disc 1 has an area in which about 640 tracks can be defined as described above, so that when the head 3 is shifted, for instance, 660 times radially outwardly with some margin, it is ensured that the head 3 is displaced to the position of the stopper 4a. In this case, even after the engagement of the carriage 4 carrying the head 3 with the stopper 4a, the head driving motor 5 is still energized, but no adverse problem arises because there exists a slip between the stators 5a and 5b and the rotor 5c.

Next step ST2 is an erase step in which, after the read/write circuit 7 is switched in response to the read/write instruction RW so that the head 3 is switched to the write mode, a DC signal is applied as the write signal WS to the read/write circuit 7. Then, the head 3 is displaced radially inwardly to erase the data on the entire surface of the disc 1. In this case, it is sufficient that the head 3 is displaced by about 660 times.

After the completion of the erase step, the head 3 is again displaced radially outwardly to the position of the radially outward stopper 4a in step ST3. As shown at the top in FIG. 4, when the vector becomes zero, the head driving motor 5 is de-energized.

In next step ST4, the head 3 is displaced radially inwardly eight times to position A indicated in FIG. 4. As shown in FIG. 4, position A is the starting point for writing the servo information SI. The vector V corresponding to this position A is 0.

The step ST5 is the step in which the servo information SI is written. That is, after the read/write circuit 7 is switched to the read mode and under the condition that the servo information write signal WS is supplied to the read/write circuit 7, the head 3 is moved radially inwardly step by step and at each position at which the head 3 is stopped, the read/write circuit 7 is switched to the write mode within a short period of time in response to the read/write instruction RW at the timing in synchronism with the index pulse IDX. In this manner, the servo information SI is written until the head 3 reaches the radially inward stopper 4b. To this end, the number of displacements of the head 3 may be of the order of 650. The subsequent steps ST6 and ST7 are similar to steps ST3 and ST4, so that the head 3 is stopped at position A, with the vector V being zero.

In next step ST8, the head 3 is displaced radially inwardly from position A to radially innermost position B; that is, the position further radially inwardly spaced apart from the track No. 614. As shown in FIG. 4, the vector V corresponding to this position B is 12 and in step ST8 the servo information SI written in the area to which the head 3 is displaced is used to detect the position of the head 3 at which the head 3 reads or write information.

In last step ST9, after the read/write circuit 7 has been switched to the read mode in response to the read/write instruction RW, the head 3 is displaced from position B to position A radially outwardly step by step, and at each position at which the head 3 is stopped, the detection instruction DS is supplied to the servo information read-out circuit 20 to read the servo information SI in synchronism with the index pulses IDX and then to confirm whether the numbers Na and Nb representative of the servo information SI are correctly read out. This confirmation may be carried out when the head 3 is displaced from position A to position B, but it is preferable to carry out such confirmation in the direction opposite to the direction in which the servo information SI is written as described above in step ST9.

In this manner, the writing of the servo information SI has been accomplished. In this embodiment, the correspondence between the position of the head 3 and the vector V of the head driving motor 5 remains in a condition that step ST6 is terminated. Here, as shown in FIG. 4, the vector V of the position of the servo information SI written in the radially outermost area is zero. Under the condition of such correspondence, the disc storage unit 30 is used.

Figure 6:
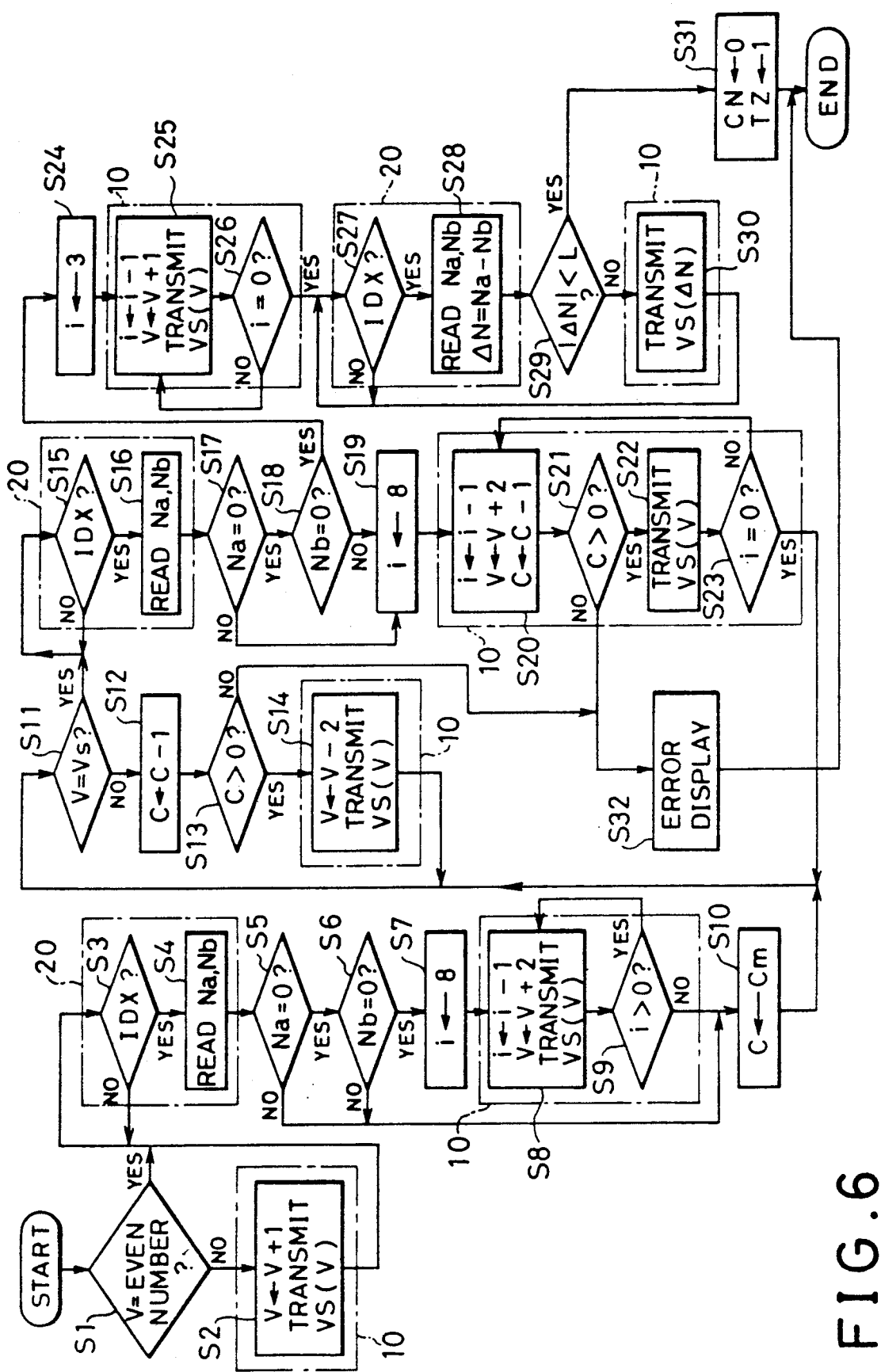
FIG. 6 is a flowchart illustrating one example of reference track detecting procedure in the present invention.

Referring next to FIG. 6, one example of the control procedures for detecting the reference track RT by using the servo information SI written on the surface of the disc in the manner described above will now be explained. In FIG. 6, the modes of operations of the vector designating means 10 and the servo information read-out circuit 20 are represented in the blocks, respectively, indicated by the dash-and-dotted lines. The flowchart in FIG. 6 shows an example of detecting, as the position of the vector 14, the boundary between the blank area 1a which is on the radially outward side of the servo information SI written on the radially outermost side of the surface of the disc 1, as shown in FIG. 2, and the area in which the servo information SI is written, thereby computing the reference track RT. In the following description, this 14th vector is referred to as a specific vector VS.

In this embodiment, the vectors of the positions at which the servo information SI is written are all even numbers, so that in first step S1, it is judged whether or not the vector number V stored in the vector designating means 10 is an even number. When the result is negative, the vector V is incremented by, for instance, one in step S2 so that the vector V becomes an even number. Thereafter, the vector designating means 10 transmits the designated vector signal VS corresponding to the above-mentioned vector V to the driver circuit 6 for the head driving motor 5, so that the position of the head 3 is displaced by one vector.

The flow from subsequent step S3 to step S9 is executed in order to position the head 3 within the area in which the servo information SI is written. That is, in steps S3 and S4, the servo information read-out circuit 20 reads out the numbers Na and Nb as the contents of the servo information SI in sychronism with the index pulses IDX. In succeeding steps S5 and S6, it is judged whether or not the servo information SI has some content by judging whether or not both the numbers Na and Nb are zero. When the result is negative; i.e., when the servo information SI has some content, the control procedure jumps to step S10. On the other hand, when the result is affirmative; i.e., when the head 3 is positioned in the blank area, the control procedure proceeds to step S7.

In the steps succeeding step S7, the head 3 is displaced radially inwardly by eight tracks, so that it is ensured that the head is maintained within the servo information area. That is, in step S7, the auxiliary variable i is set to the number of displacement, i.e., eight and in next step S8 the auxiliary variable i is decremented by one and the vector V is incremented by two. The designated vector signal VS corresponding to the above-mentioned vector is transmitted to the driver circuit 6 for the head driving motor 5, so that the head 3 is displaced radially inwardly by two vectors. In step S9, it is judged whether or not the head 3 is displaced eight times and when the results is negative, the control procedure returns to step S8. When the head 3 is displaced eight times accomplished, the auxiliary variable i becomes zero. Then, the control procedure proceeds to step S10.

In step S10, the maximum allowable number Cm for the number of displacements is loaded into a down count C of the displacement number. The maximum allowable number Cm is a number for preventing that the flow of the control procedure circulate permanently without escaping from a loop due to the failure in the detection of the reference track RT and a sufficiently great number is selected as Cm.

In this embodiment, the specific vector VS corresponding to the position which must be detected as the boundary between the servo information area and the blank area is designated as 14 as described above. Accordingly, only when the head 3 is at the position corresponding to the specific vector VS, it is judged whether or not the servo information SI is present. It follows, therefore, that the steps from S11 to S14 are carried out in order to first position the head 3 at the position corresponding to the specific vector VS. That is, in step S11, it is judged whether or not the vector V coincides with the specific vector VS. When the result is negative, it is comfirmed that the number of displacements of the head 3 is within the maximum allowable number Cm in steps S12 and S13. After the comfirmation, the vector V is incremented by two in the negative direction in step S14 and the designated vector signal VS corresponding to the vector incremented by two in the negative direction is transmitted. As a result, the head 3 is displaced radially outwardly by one track. Thereafter, the control procedure returns to step S11.

When the head 3 is brought into the position corresponding to the specific vector VS, the control procedure advances from step S11 to steps S15 and S16. In these steps, the servo information read-out circuit 20 reads out the numbers Na and Nb representative of the content of the servo information SI in synchronism with the index pulses IDX. In the following steps S17 and S18, it is judged whether or not the numbers Na and Nb read out are all zero. When the result is negative; that is, when the head 3 is at the position corresponding to the specific vector VS, but is still within the servo information area, the control procedure advances to step S19.

In the steps from S19 to S23, the head 3 is displaced radially outwardly by eight tracks to the next position corresponding to the specific vector VS. In step S19, the auxiliary variable i is set the number of the displacement of the head 3 at eight and then the vector designating means 10 starts its operation. In step S20, the auxiliary variable i and the count C are decremented each by one and the vector V is incremented by two and in step S21 the count C is confirmed. After the head 3 is displaced radially outwardly in response to the designated vector signal VS in step S22, the above-described steps S20-S22 are repeated via step 23. When the head 3 is radially outwardly displaced by eight tracks, so that the auxiliary variable i becomes zero, the control procedure returns to step S11. In this case, the control procedure may be returned to step S15, but after the vector V is confirmed as the specific vector VS again by way of precaution in step S11, the control procedure proceeds to step S15.

As described above, the head 3 is sequentially displaced radially outwardly and brought into the position corresponding to the specific vector VS within the blank area 1a, so that both the numbers Na and Nb representative of the content of the servo information SI become zero; i.e., when the result of the judgement in step S18 is affirmative, then the boundary between the servo information area and the blank area is detected, so that it is judged that the head 3 now positions at the boundary thus detected.

The steps following step S24 are executed to compute the reference track RT based on the boundary position. As is clear from FIG. 2, in this embodiment, the reference track RT is defined at the position at which the vector is 1, so that the reference track RT is radially inwardly spaced apart from the specific vector VS by three vectors. It follows, therefore, that in steps from S24 to S26, the head 3 is radially inwardly displaced by three vectors to the reference track RT. That is, in step S24, the auxiliary variable i is set at three. In steps S25 and S26 in which the vector designating means 10 operates, the vector is incremented by one three times, so that the head 3 is positioned at the reference track RT. Then, the computation of the reference track RT is completed and, accordingly, the detection of the reference track RT is also completed.

Thereafter, the control procedure may jump to step S31 to be described below, but in this embodiment, after step S26, the procedure proceeds to steps from S27 to S30 in which the position of the head 3 is corrected to the normal position which is the center of the reference track RT. Subsequently, the control procedure advances to step S31 from step S29. In the case of the above-described correction, the fundamental function of the servo information SI; that is, the function for detecting the position of the head 3 is utilized. In steps S27 and S28, the servo information read-out circuit 20 reads out the content of the servo information SI in the form of the numbers Na and Nb in synchronism with the index pulses IDX. The difference $\Delta N$ between the two read-out numbers Na and Nb; that is, $\Delta N = Na - Nb$ is computed as an amount of the off-track of the head 3 from the normal position of a track.

In next step S29, the off-track amount $\Delta N$ is compared with an allowable limit L and when the result is $|\Delta N| \geq L$, the control procedure advances to step S30, in which the designated vector signal VS adapted to correct the off-track amount $\Delta N$ is transmitted to the driver circuit 6 for the head driving motor 5, so that the position of the head 3 is corrected. Thereafter, the control procedure is returned to step S27.

When the off-track amount $\Delta N$ detected by one or more corrections of the position of the head 3 is less than the allowable limit L, the correction is completed and the control procedure advances to final step S31.

In step S31, the cylinder number CN (which is zero in this embodiment) of the reference track RT is stored as the cylinder number CN of the disc storage unit 30. Then, the detection of the reference track RT is completely accomplished and thereafter the head 3 is displaced to a desired track with referring to the stored cylinder number CN. In this embodiment, in step S31, the track zero signal TZ is rendered to "1" and then transmitted to the controller 40, thereby informing the controller 40 of the completion of the detection of the reference track RT. In many cases, the detection of the reference track RT is instructed from the controller 40 to the disc storage unit 30, so that in response to the track zero signal TZ, the controller 40 now recognizes the completion of the detection of the reference track RT and therefore can inform the disc storage unit 30 of the next operation instruction.

When the count C becomes zero in step S13 or S21 in the flowchart shown in FIG. 6, so that the reference track RT cannot be detected, even after the procedure has been repeated the maximum allowable number Cm times, the control procedure proceeds to step S32, in which an error display of a certain erroneous operation of the disc storage unit 30 is made and the operation thereof is completed.

Except the above-described embodiment, the present invention can be carried out in various manners. For instance, the steps for writing the servo information SI or the steps for detecting the reference track RT can be optionally selected. So far, it has been described that in the above-explained embodiment, the blank area in which no servo information SI is written is defined only in one portion on the radially outward side of the radially outermost track, but the blank area may be also provided in a portion on the radially inward side of the radially innermost track. In the above-explained embodiment, it has been described that the boundary between the servo information area and the blank area is detected by displacing the head 3 radially outwardly, but it is to be understood that the boundary detection can be made by displacing the head 3 radially inwardly. It is of course possible to arbitrarily select the direction of the displacement of the head 3 in the case of the detection of the boundary.

Furthermore, while in the above-described embodiment, a specific vector is predetermined and the servo information SI is read out only when the position of the head 3 corresponds to the predetermined vector, it is of course apparent that when time required for the detection of the reference track may be extended, it is not necessary to use the detection method of the type described above.

As described above, according to the present invention, a position sensor such as photo interruptor exclusively for detecting the reference track used in a conventional disc storage unit is totally eliminated, but the reference track is detected precisely in a simple manner. Furthermore, the cost of the position sensor and a space required for the installation thereof can also be eliminated and time-consuming fine adjustment of the position of the photosensor installed is completely eliminated. Servo information which is utilized when the present invention is carried out is inherently needed in a disc storage unit, so that it is not necessary to modify its writing manner when writing the servo information. In addition, it is not necessary to specially incorporate the vector designating means and the servo information read-out circuit for writing and reading out the servo information into the disc storage unit in order to carry out the present invention.

Thus, according to the present invention, the above-described effects and features can be attained at a minimum cost required for providing some additional software, while the means and circuits fundamentally incorporated in the disc storage are utilized. Therefore, according to the present invention, high realibility in operation can be ensured by the simplified calibration of the disc storage unit and manufacturing of the disc storage unit can be improved because of the reduction of the cost and space.

The invention has been described in detail with respect to embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. In combination with a disc storage unit comprising a disk having a plurality of tracks, including a reference track, defined on the surface thereof; a head displaceable with respect to said disc; a polyphase head driving motor mechanically coupled to said head for displacement thereof relative to said disc; vector designating means for designating a plurality of even and odd numbered vectors defined by polyphase currents flowing through said head driving motor; and servo information read-out means for reading out servo information sensed by said head, said servo information corresponding to each track and being written onto the surface of said disc for detecting the position of said head; the method of detecting said reference track comprising the steps of:

writing said servo information into a servo information area defined as a sector formed by partially interrupting circumferentially said plurality of tracks within a radial area of said surface in which said head is displaceable, the radially outermost track among said plurality of tracks being designated as said reference track, servo information not being written onto a blank area defined as radially outward of said reference track within said radial area, a boundary being thereby established between said servo information area and said blank area;

sequentially designating vectors to said head driving motor by said vector designating means to sequentially displace said head in a predetermined radial direction;

reading out said servo information by said servo information read-out means sensed by said head while said head is being displaced sequentially in said predetermined radial direction;

detecting said boundary between said servo information area and said blank area by determining whether or not servo information is read out by the preceding step; and computing the position of said reference track in the radial direction based upon said boundary detected in the preceding step to detect said reference track, whereby said tracks are defined at positions in the radial direction corresponding to even-numbered vectors formed by said polyphase currents flowing through said head driving motor, said servo information is written at the positions in the radial direction corresponding to odd-numbered vectors formed by said polyphase currents flowing through said head driving motor and, in the case of the detection of said boundary between said servo information area and said blank area, said head is sequentially displaced in the radial direction corresponding to said odd-numbered vectors.

2. A reference track detecting method as claimed in claim 1, wherein said blank area is defined only in one area within said radial area.

3. In combination with a disc storage unit comprising a disk having a plurality of tracks, including a reference track, defined on the surface thereof; a head displaceable with respect to said disc; a polyphase head driving motor mechanically coupled to said head for displacement thereof relative to said disc; vector designating means for designating a plurality of even and odd numbered vectors defined by polyphase currents flowing through said head driving motor; and servo information read-out means for reading out servo information sensed by said head, said servo information corresponding to each track and being written onto the surface of said disc for detecting the position of said head; the method of detecting said reference track comprising the steps of:

writing said servo information into a servo information area defined as a sector formed by partially interrupting circumferentially said plurality of tracks within a radial area of said surface in which said head is displaceable, the radially outermost track among said plurality of tracks being designated as said reference track, servo information not being written onto a blank area defined as radially outward of said reference track within said radial area, a boundary being thereby established between said servo information area and said blank area;

sequentially designating vectors to said head driving motor by said vector designating means to sequentially displace said head in a predetermined radial direction;

reading out said servo information by said servo information read-out means sensed by said head while said head is being displaced sequentially in said predetermined radial direction;

detecting said boundary between said servo information area and said blank area by determining whether or not servo information is read out by the preceding step; and computing the position of said reference track in the radial direction based upon said boundary detected in the preceding step to detect said reference track;

and further comprising the steps of:

allotting in advance a specific vector formed by said polyphase currents to said boundary between said servo information area and said blank area to be detected;

confirming that said head is brought into a position corresponding to said specific vector while said head is being sequentially displaced;

reading out said servo information by said servo information read-out means when it is confirmed that said head is at said position corresponding to said specific vector, thereby detecting said boundary.

4. A reference track detecting method as claimed in claim 3, wherein said blank area is defined only in one area within said radial area.

5. A disc storage unit comprising:
a head;
a disc having a plurality of tracks, including a reference track, defined on the surface thereof, and having servo information corresponding to each track written onto the surface for detecting the position of said head, said servo information being written into a servo information area defined as a sector formed by partially interrupting circumferentially said plurality of tracks within a radical area of said surface in which said head is displaceable, the radially outermost track among said plurality of tracks being designated as said reference track, servo information not being written onto a blank area defined as radially outward of said reference track within said radial area, a boundary being thereby established between said servo information area and said blank area;

a polyphase driving motor mechanically coupled to said head for displacment thereof relative to said disc;

vector designating means for designating vectors defined by polyphase currents flowing through said head driving motor, said vector designating means sequentially designating vectors to said head driving motor to sequentially displace said head in a predetermined radial direction;

servo information read-out means for reading out said servo information sensed by said head while said head is being displaced sequentially in said predetermined radial direction;

means for detecting said boundary between said servo information area and said blank area when it is determined whether or not servo information is read out by the servo information read-out means;

means for computing a position of said reference track in the radial direction, based upon said boundary detected by said means for detecting, to detect said reference track whereby said tracks are defined at positions in the radial direction corresponding to even-numbered vectors formed by said polyphase currents flowing through said head driving motor, said servo information is written at the positions in the radial direction corresponding to odd-numbered vectors formed by said polyphase currents flowing through said head driving motor; and further comprising:

means for sequentially displacing said head in the radial direction corresponding to said odd-numbered vectors upon detection of said boundary between said servo information area and said blank area.

6. A disc storage unit as claimed in claim 5, wherein said blank area is defined only in one area within said radial area.

7. A disc storage unit comprising:
a head;
a disc having a plurality of tracks, including a reference track, defined on the surface thereof, and having servo information corresponding to each track written onto the surface for detecting the position of said head, said servo information being written into a servo information area defined as a sector formed by partially interrupting circumferentially said plurality of tracks within a radial area of said surface in which said head is displaceable, the radially outermost track among said plurality of tracks being designated as said reference track, servo information not being written onto a blank area defined as radially outward of said reference track within said radial area, a boundary being thereby established between said servo information area and said blank area;

a polyphase driving motor mechanically coupled to said head for displacement thereof relative to said disc;

vector designating means for designating vectors defined by polyphase currents flowing through said head driving motor, said vector designating means sequentially designating vectors to said head driving motor to sequentially displace said head in a predetermined radial direction;

servo information read-out means for reading out said servo information sensed by said head while said head is being displaced sequentially in said predetermined radial direction;

means for detecting said boundary between said servo information area and said blank area when it is determined whether or not servo information is read out by the servo information read-out means;

means for computing a position of said reference track in the radial direction, based upon said boundary detected by said means for detecting, to detect said reference track;

and further comprising:

means for confirming that said head is brought into a position corresponding to a specific vector, said specific vector formed by said polyphase currents being allotted in advance to said boundary between said servo information area and said blank area to be detected, while said head is being sequentially displaced;

said servo information read-out means reading out said servo information when it is confirmed that said head is at said position corresponding to said specific vector;

whereby said means for detecting said boundary thereby detects said boundary.

8. A disc storage unit as claimed in claim 7, wherein said blank area is defined only in one area within said radial area.

* * * * *